United States Patent Office.

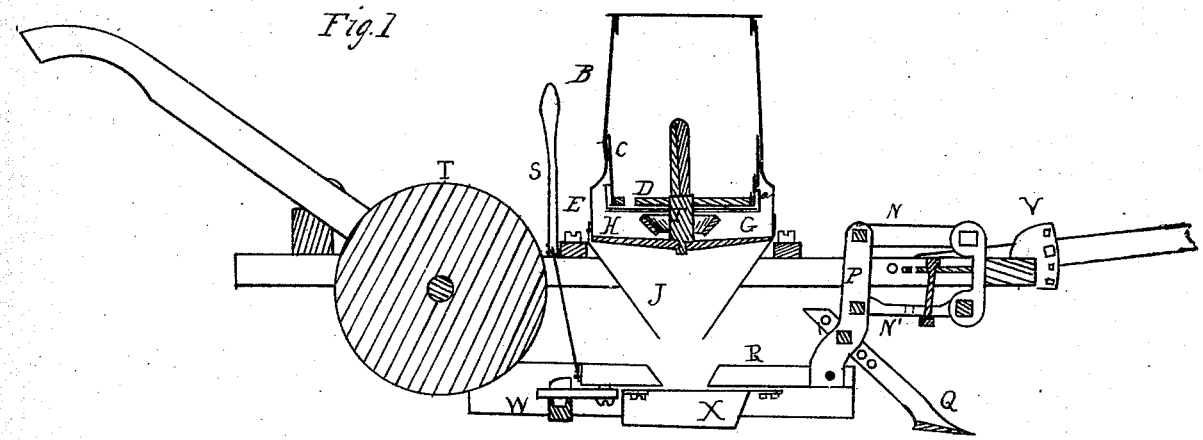
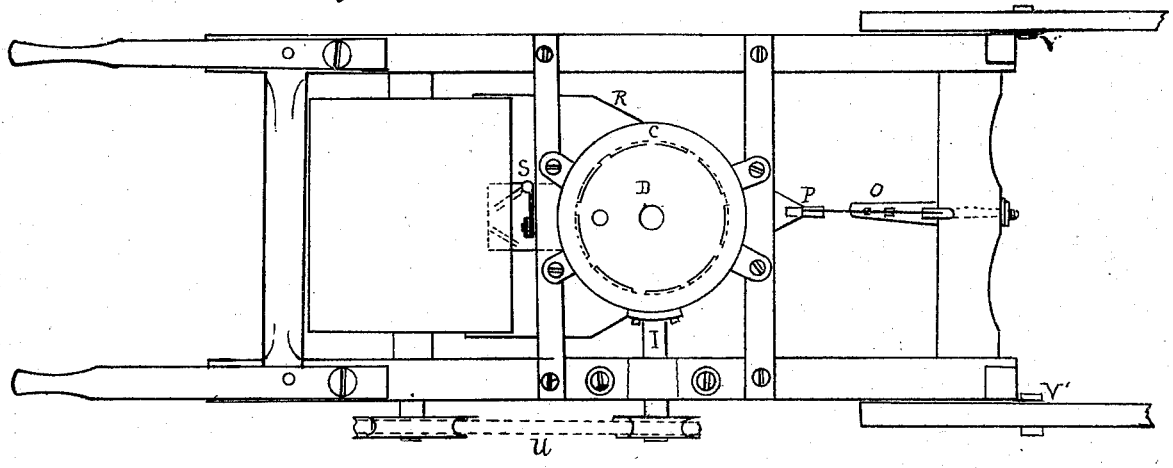
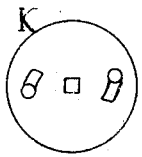
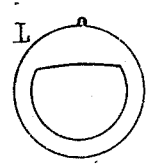
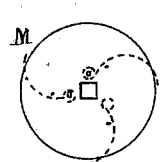

NEWTON FOSTER, OF PALMYRA, NEW YORK.

Letters Patent No. 74,334, dated February 11, 1868.

IMPROVEMENT IN COTTON-SEED AND CORN-PLANTERS.

*The Schedule referred to in these Letters Patent and making part of the same.*

TO ALL WHOM IT MAY CONCERN:

Be it known that I, NEWTON FOSTER, of Palmyra, in the county of Wayne, and State of New York, have invented a new and useful Improvement in Cotton-Seed and Corn-Planters; and I do hereby declare that the following is a full, clear, and exact description of the construction and operation of the same, reference being had to the annexed drawings making a part of this specification, in which—

Figure 1 is a longitudinal section.
Figure 2 is a bird's-eye view.
Figure 3 is the corn-distributer.
Figure 4 is a separator or annular rim.
Figure 5 is the circular ejecting-plate.
Figure 6 is an opener or furrow-marker.

The letters of reference refer to the same parts in each figure.

The nature of my invention consists in making a cotton-seed and corn-planter that may be drawn by a horse and held by a man, and plant the seed in hills or drills, and at the same time remove clods and stone, and deposit the seed and cover it, and then roll the ground, all in one operation.

To enable others skilled in the art to make and use my invention, I will proceed to describe its mode of construction and operation.

A is the framework that holds the parts together. It may be made of wood, of any required size or strength. To it the handles and thills are attached, as shown in figs. 1 and 2. B is a hopper. Into it the seed is deposited. It may be made any size or shape; but it is better to make it smaller at the top. It surrounds and is held by the rim C. C is a rim, fastened to the inside of the case E, with a part extending above and a part below its place of attachment, to hold the hopper and the diaphragm D. D is a diaphragm. It is made with a journal-box in the centre, and a hole or holes for corn to pass down through, and a vertical rim around its periphery. This rim has a series of apertures through it for cotton-seed to pass through. These apertures may be made so that any part of them may be closed at will, or their size may be increased or diminished by raising or lowering the diaphragm, or the rim by which it is held. E is the case. It encases and supports the various parts connected with it. It is made cylindrical in form, with the upper end contracted, as shown in fig. 1, to join the other parts, and allow sufficient space below. The lower end has projections, with holes through them, to bolt it to the cross-pieces that lie upon the frame, as shown in fig. 2. Across the lower end is a support for the spindle F, as shown in the figure. F is a spindle. It is shown in fig. 1. The lower end is held by the cross-piece at the bottom of the case E, and passes up through a mitre-pinion, bar G, and the diaphragm, with its upper end above the diaphragm made parallelopiped, to turn parts that are applied to it. G is a bar, fastened to the spindle E between the pinion and diaphragm. It extends outward beyond the diaphragm, and each end is turned upward near to the rim C. To these parts are attached bent springs, that scrape off the seeds that are forced through the apertures in the rim of the diaphragm. These springs are shown in fig. 1 by red lines, and designated by the letter *a*. H is a mitre-pinion. It is securely fastened to the spindle F. It is driven by a corresponding pinion on the axle I, that is shown in fig. 2. I is an axle, that has a mitre-pinion at the end towards the centre, and a driving-pulley for chain or belt at the other. It is held in a journal-box on the frame, and one at the bottom of the case E. J is a tunnel-shaped conductor. Its use is to conduct the seed down, so that it will fall through the scraper. K is a distributer for corn. It is represented in fig. 3. It may have any number of holes through it, and of any size required. The corn drops into the holes when they are uncovered, and then pass down through the diaphragm. It is placed upon the spindle F, by which it is driven. It must be made so large as to prevent corn passing out through the rim of the diaphragm. L is an annular rim, represented in fig. 4. It is laid upon the distributer. Its use is to strike the holes in the distributer, and prevent corn falling down through when the holes of the distributer pass over the holes of the diaphragm. M is a circular plate, made as represented in fig. 5, and made to fit upon the upper end of the spindle F, by which it is turned. It is provided with a series of curved springs, as shown in the figure. Any number of the springs may be used to give the required quantity of seed. The use of this is to eject seed through the apertures in the rim of the diaphragm. N and N' are parallel draught-bars. The forward ends are held to the double clevis that is fastened to the forward cross-piece of the frame. The rear ends are held by bolts to the upright piece P. Their use is to hold the upright P, and allow it to be raised or lowered without changing its vertical position. O is a bar, with the forward end made as a screw-bolt, and passed through the clevis and cross-piece. The rear end has a series of holes for a bolt, that passes through N'. The use of this is to regulate the depth of the plough and scraper, and it is shown in fig. 1. P is an upright piece, made and held as shown in fig. 1. It supports the plough Q, and the lower end is fastened to the forward end of the scraper. Its use is to hold the plough and draw the scraper. Q is a shovel-plough. The upright part has a series of holes, so that it may be raised or lowered to the depth of furrow required. R is a scraper. It is made with a triangular-shaped piece of wood, with a hole through it, as shown in fig. 1, and surrounded with a band of iron or steel, which extends backward, so that the roller will roll between the ends, and thus keep it in proper position. S is a lever, pivoted to the rear iron cross-piece. It has an arm, with a series of holes in it, and a connecting-rod from it to the rear part of the wood of the scraper. Its use is to raise up the scraper for transportation, or when not used. T is a roller. It may be made of wood or iron, and any size or weight required. It has an axle, that is held to the frame in journal-boxes. The axle extends beyond the frame at the right-hand side to receive a pulley, as shown in fig. 2. The use of this roller is to smooth and pack the ground upon the seeds. U is a belt or chain, that transmits motion from the pulley on the roller-axle to the pulley on the axle I. This should be made so that the length may be varied when larger or smaller pulleys are used on either axle. V and V' are plates to the forward end of each side piece of the frame. They are made with a series of bolt-holes, as shown in fig. 1. Their use is to raise or lower the forward end of the thills, and thus raise or lower the plough and scraper. W is a coverer, made of metal, and it is held loosely to the rear part of the wood of the scraper, as shown in figs. 1 and 2. It is provided with two blades, that are set in a triangular position, and they may be adjusted and held by wedges or bolts, so as to cover seed the required depth. X is an opener or furrow-marker. It is made of iron, as shown in fig. 6. It is applied to the under side of the wood of the scraper, so that seed may drop down through it. It may be made adjustable, so that it will make as deep a furrow as is required to plant the seed the proper depth.

Having thus fully described my invention, what I claim as new, and desire to secure by Letters Patent, is—

1. I claim the diaphragm D and the bar G, when made and applied as and for the purpose set forth.
2. I claim the opener X, when applied to the scraper R, and used substantially as set forth.
3. I claim the extension of the iron of the scraper R, by the ends of the roller T, as and for the purpose set forth.
4. I claim the construction and arrangement of the parallel draught-bars N and N', the bar O, and upright P, when held and used substantially as specified.
5. I claim the distributer K, and annular rim L, when applied and used in combination with the spindle F and diaphragm D, substantially as set forth.

NEWTON FOSTER.

Witnesses:
J. P. VAIL,
CHARLES KETCHUM.